Patented Sept. 2, 1924.

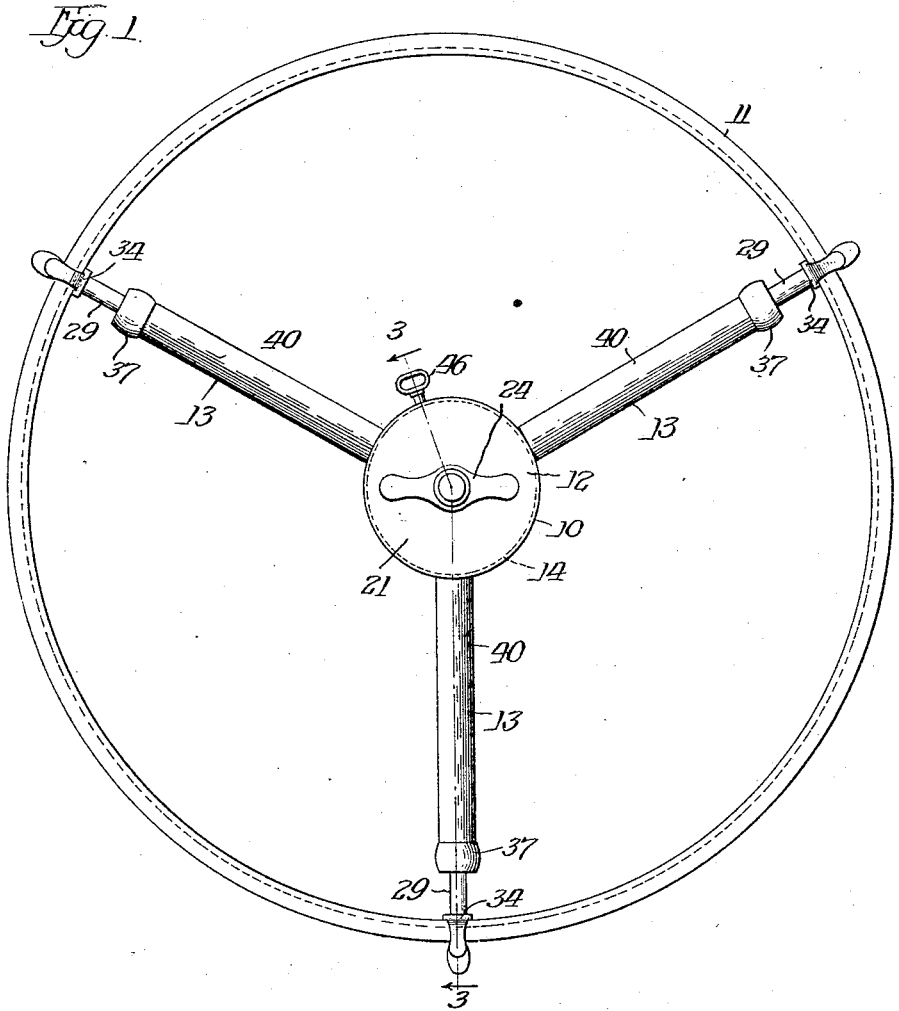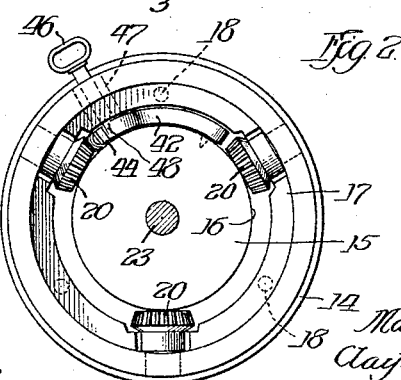

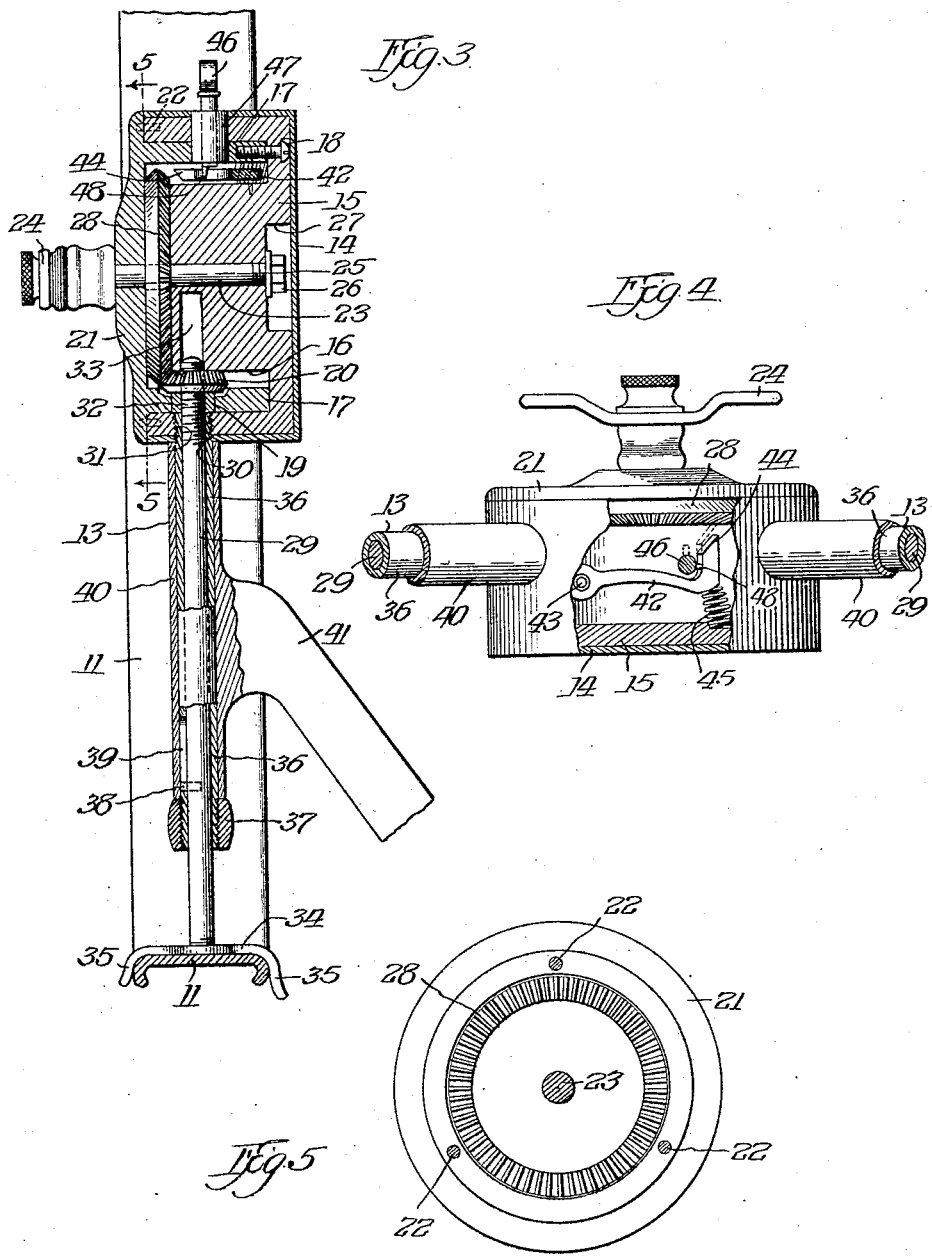

1,506,977

UNITED STATES PATENT OFFICE.

MAX G. DICHWOLF AND CLAYTON E. SCHULTZ, OF CHICAGO, ILLINOIS.

TIRE CARRIER.

Application filed May 31, 1921. Serial No. 474,028.

*To all whom it may concern:*

Be it known that we, MAX G. DICHWOLF and CLAYTON E. SCHULTZ, citizens of the United States, residing at Chicago, in the county of Cook and State of Illinois, have invented certain new and useful Improvements in a Tire Carrier, of which the following is a specification.

This invention pertains in its general aspect to carrying devices, and more particularly is concerned with a carrier adapted to support a spare tire or tires of a motor vehicle.

The main and primary objects of the invention, broadly stated, reside in the provision of such a carrier which is adapted to engage and hold snugly without play tire rims of various sizes; which automatically serves to center the rim relative thereto; which upon engaging the rim holds the same securely against removal by unauthorized persons but readily disengages the rim when the proper key to the mechanism in the possession of the owner is employed; and which functions quickly to engage or disengage the rim by the easy manipulation of a single centrally located operating member whereby even a lady or child may, without effort and the soiling of hands or clothes, remove from or replace a spare tire on the carrier.

In addition to the above attributes, the tire carrier of this invention is characterized by an extremely attractive design which adds materially to the appearance of any motor vehicle on which the device is mounted for use.

Further objects and advantages of the invention will become apparent as the nature of the same is more fully understood from the following detailed description and accompanying drawings wherein is presented one embodiment of the device. It should be understood, however, that the particular embodiment and adaptation of the invention here set forth is chosen primarily for the purpose of exemplification, and that various slight modifications in unessential structural details may be undertaken, if found desirable, without departing from the spirit of the invention as defined by the appended claims.

In the drawings—

Fig. 1 is a face elevation of the tire carrier of this invention, showing the manner in which it engages a tire rim;

Fig. 2 is a detail view of a portion of the mechanism within the hub or center portion of the carrier;

Fig. 3 is an irregular section taken on the line 3—3 of Fig. 1, showing certain parts of the sectioned internal mechanism in side elevation;

Fig. 4 is a fragmentary top plan view of the carrier hub portion with a part of the casing thereof broken away to disclose the interior mechanism at that point; and Fig. 5 is a section on the line 5—5 of Fig. 3, the section being offset adjacent the middle of the carrier to include the master gear 28 in elevation.

Referring now in more detail to the drawings the numeral 10 is used to designate generally the tire carrier of the present invention which is shown in Figs. 1 and 3 as supporting a tire rim 11 of the ordinary type. The pneumatic tire associated with said rim is unessential to the illustration of the carrier operation, and is accordingly omitted in the drawings.

The carrier 10 is composed of a central hub-like member 12 and three arms 13 which radiate therefrom at points equally spaced about the periphery of the central member. While three of said arms are here described and shown it will be readily appreciated that any number of the same might be employed with measurably satisfactory results.

The above mentioned central hub-like member 12 consists of cylindrical casing 14 the rear face of which is closed. A cylindrical skeleton frame 15 fits snugly within said casing and is provided in its front face with a deep annular groove 16 which is adapted to receive a relatively thin annulus 17. This annulus is secured rigidly to the frame 15 by screws 18 or other means, and is recessed at regular intervals about its circumference in order to provide bearing portions for the journals 19 of three beveled pinions 20 which are axially apertured and threaded for a purpose hereinafter set forth.

A circular cover plate 21 closes the front face of the casing 14 and carries dowel pins 22 which project into apertures in the frame 15 whereby to prevent turning of the said cover plate relative thereto. The cover plate is prevented from axial withdrawal from the frame 15 by means of a shaft 23 which passes through central apertures in both the plate 21 and the frame 15. The front end of this shaft has keyed thereto a transverse handle 24, while the rear end is threaded to receive a washer 25 and nut 26 which seat between the rear face of the casing and the frame 15 in a central relieved portion 27 of the latter.

A flat bevel gear 28 is keyed on the shaft 23 between the cover plate 21 and frame 15. This gear meshes with each of said bevel pinions 20 and serves to rotate them in unison when the handle 24 which operates the gear 28 is turned.

The radial arms 13, which were previously referred to in a general way, radiate from the central member 12 of the casing in alignment with the axes of the pinions 20. Each arm is composed of a radially reciprocating rod 29 which passes through aligned apertures 30 and 31 in the casing 14 and frame 15, and is screw-threaded on its inner end 32 to engage within the threaded bore of the pinion 20. The central portion of the frame 15 radially inward from the pinion 20 is provided with a deep recess 33 whereby to permit inward movement of the rod 29 beyond the inner face of the pinion 20. The outer end of the rod 29 is equipped with a rim-engaging head or yoke 34 having upturned extremities 35 which prohibit the lateral withdrawal of a tire rim when the same is engaged thereby. While the particular form of yoke here shown is preferable when only one spare is to be carried, it will be understood that by merely widening the yoke portion between its extremities the carrier is adapted to support two or more spares. Furthermore, this rim-engaging head or yoke may, in some cases, assume the form of a prong for engaging within a recess on the inner face of the rim.

A tube 36 encompasses each of the rods 29 and has its inner end in threaded engagement with the above mentioned apertures 30 and 31 in the casing 14 and the frame 15. Any suitable means, such for instance as a key, is provided at this point of engagement to prevent turning of the tube after being properly positioned. The outer end of the tube 36 is threaded to receive a cap 37. A small transverse pin 38 projects slightly from one or both sides of the rod 29 and enters a longitudinal slot or slots 39 in the tube whereby to prevent turning of the rod while permitting radial reciprocating movement of the same when so actuated by rotation of its pinion 20 through movement of the handle 24 and the flat master gear 28.

A sleeve 40 is disposed about each of the tubes 36 between the casing 14 and the cap 37, and serves to cover both the pin 38 and its slot 39 and to provide convenient means for attaching the bracket members 41 which support the carrier on the rear of the vehicle chassis.

By the construction so far described the rods 29 of the radial arms 13 will be moved in unison outwardly or inwardly, depending upon the direction in which the handle 24 is turned. In order to prevent the inward movement of said rods—except by the act of authorized persons—the following locking means is provided. Referring more particularly to Figs. 3 and 4 of the drawings, it will be noted that a ratchet pawl 42 is disposed, intermediate the two upper arms 13, in the annular groove 16 of the frame 15 inwardly of the annulus 17. This pawl is pivoted to said frame at 43, and has its free bevelled nose 44 pressed into the teeth of the flat bevelled gear 28 by a coil spring 45 positioned therebelow. Because of the bevelled face of the pawl nose the gear 28 is allowed to turn freely to move the rods 29 outwardly, but, when the gear moves in the opposite direction, its teeth lock with the nose of the pawl and movement of the gear is prevented until retraction of the pawl is accomplished.

The retraction of the pawl is controlled by a removable lock key 46 which is inserted through a key hole in the casing into the tumbler cylinder 47 of a lock of any approved type. The extremity of the key extends into the annular groove 16 of the frame 15 in the form of an eccentric projection 48 which, when the key is turned to the "unlock" position, cams the pawl downwardly out of engagement with the gear 28 whereby movement of the gear to move the rim-engaging rods 29 inwardly may be accomplished. Upon withdrawal of the key it will be appreciated that outward movement of the rods 29 may still be effected, but inward movement of the same for removal of a tire rim is effectively prevented.

We claim:

1. A tire carrier comprising a central portion having a plurality of radially reciprocal arms projecting therefrom; said central portion including a master pinion disposed with its axis perpendicular to the axes of the arms at their central point of intersection, a plurality of pinions each of which is adapted to translate the rotary motion of the master pinion into the reciprocal motion of one of the arms and is arranged about the axis of the master pinion on the side thereof from which the particular arm operated thereby projects from the central portion of the carrier, and a member providing both a journal bearing for the master pinion and thrust bearings for the pinions connected with the arms.

2. A tire carrier comprising a central portion having a plurality of radially reciprocal arms projecting in one plane therefrom; said central portion including a plurality of axially apertured and screw-threaded pinions journaled in bearings provided by the central portion in screw threaded engagement with the arms, a master pinion meshing with each of said pinions to rotate the same in unison, and means for rotating said master pinion; and each of said arms comprising a reciprocal member threaded on its inner end and provided on its outer end with rim-engaging means, and means to prevent angular movement of said member while freely permitting reciprocal movement of the same.

3. A tire carrier comprising a closed central portion having a plurality of radially reciprocal arms projecting therefrom; said central portion including a plurality of axially apertured and screw threaded pinions journaled therein with their axes radially disposed, a master pinion meshing with each of said pinions to rotate the same in unison, means for rotating said master pinion, and inaccessible locking means functioning when operative to prevent rotation of the said master pinion in one direction whereby to prohibit movement of the arms inwardly without interfering with movement of the arm outwardly, said locking means including a pawl having a bevelled nose and means for normally holding the nose of said pawl in engagement with the teeth of said master pinion; and each of said arms comprising a reciprocal member threaded on its inner end to engage within the threaded aperture of one of said apertured pinions, and means to prevent angular movement of said member while freely permitting reciprocal movement of the same.

In testimony whereof we have hereunto signed our names.

MAX G. DICHWOLF.
CLAYTON E. SCHULTZ.